(12) United States Patent
Schneider et al.

(10) Patent No.: US 10,685,141 B2
(45) Date of Patent: Jun. 16, 2020

(54) METHOD FOR STORING DATA BLOCKS FROM CLIENT DEVICES TO A CLOUD STORAGE SYSTEM

(71) Applicant: ABB Schweiz AG, Baden (CH)

(72) Inventors: Johannes Schneider, Fislisbach (CH); Matus Harvan, Zürich (CH); Sebastian Obermeier, Schinznach-Dorf (CH); Thomas Locher, Zürich (CH); Yvonne-Anne Pignolet, Zürich (CH)

(73) Assignee: ABB Scheiz AG, Baden (CH)

( * ) Notice: Subject to any disclaimer, the term of this patent is extended or adjusted under 35 U.S.C. 154(b) by 0 days.

(21) Appl. No.: 16/266,151

(22) Filed: Feb. 4, 2019

(65) Prior Publication Data

US 2019/0171847 A1 Jun. 6, 2019

Related U.S. Application Data

(63) Continuation of application No. PCT/EP2017/069286, filed on Jul. 31, 2017.

(30) Foreign Application Priority Data

Aug. 3, 2016 (EP) ..................................... 16182643

(51) Int. Cl.
*H04L 29/06* (2006.01)
*G06F 21/62* (2013.01)
(Continued)

(52) U.S. Cl.
CPC .......... *G06F 21/6272* (2013.01); *G06F 3/067* (2013.01); *G06F 3/0623* (2013.01);
(Continued)

(58) Field of Classification Search
CPC ...... G06F 21/64; G06F 21/6272; G06F 3/067; H04L 9/08; H04L 9/3236; H04L 9/3242; H04L 63/0435
See application file for complete search history.

(56) References Cited

U.S. PATENT DOCUMENTS 7,792,300 B1 * 9/2010 Caronni ............ G06Q 20/3829
380/259
8,099,605 B1 1/2012 Billsröm et al.
(Continued)

FOREIGN PATENT DOCUMENTS

WO 2011076463 A1 6/2011

OTHER PUBLICATIONS

European Patent Office, International Search Report & Written Opinion issued in corresponding Application No. PCT/EP2017/069286, dated Oct. 27, 2017, 12 pp.
(Continued)

*Primary Examiner* — Hosuk Song
(74) *Attorney, Agent, or Firm* — Taft Stettinius & Hollister LLP; J. Bruce Schelkopf

(57) ABSTRACT

The invention relates to a method for storing data blocks from client devices to a cloud storage system, the method includes the steps of: d) storing an encrypted first data block and a challenge of the first data block of a first client device on the cloud storage system, e) determining if a hash of a second data block of a second client device stored on the cloud storage system equals the hash of the first data block, f) if yes, transmitting the challenge of the first data block from the cloud storage system to the second client device, g) extracting, at the second client device, the bits at the positions or at the range contained in the challenge, hashing the extracted bits, encrypting the hashed bits with a public key of the first client device or of the second client device and uploading the encrypted bits from the second client (Continued)

device to the cloud storage system, and h) storing the encrypted bits from the second client device on the cloud storage system.

20 Claims, 5 Drawing Sheets

(52) U.S. Cl.
CPC ........ *G06F 3/0647* (2013.01); *G06F 11/1453* (2013.01); *G06F 21/64* (2013.01); *H04L 9/0894* (2013.01); *H04L 9/3236* (2013.01); *H04L 63/0435* (2013.01); *H04L 63/0478* (2013.01)

(56) References Cited

U.S. PATENT DOCUMENTS

| | | | | |
|---|---|---|---|---|
| 8,788,806 B2* | 7/2014 | Begum | ................. | H04L 9/0822 380/277 |
| 8,848,924 B2* | 9/2014 | Kohno | ................. | G06F 21/6245 380/284 |
| 8,924,511 B2* | 12/2014 | Brand | ................. | H04L 67/1097 709/218 |
| 9,031,229 B1* | 5/2015 | Nita | ................. | H04L 9/008 380/28 |
| 9,237,014 B2* | 1/2016 | Leung | ................. | H04L 9/0631 |
| 9,253,166 B2* | 2/2016 | Gauda | ................. | G06F 21/6218 |
| 10,083,194 B2* | 9/2018 | Patey | ................. | H04L 9/00 |
| 2013/0246790 A1 | 9/2013 | Wang | | |

OTHER PUBLICATIONS

European Patent Office, Extended Search Report issued in corresponding Application No. 16182643.3, dated Jan. 27, 2017, 10 pp.
Mulazzini et al., "Dark Clouds on the Horizon: Using Cloud Storage as Attack Vector and Online Slack Space," SBA Research, Jun. 24, 2011, 11 pp.
Di Pietro et al., "Proof of ownership for deduplication systems: A secure, scalable, and efficient solution," Computer Communications, vol. 82, 2016, pp. 71-82.

* cited by examiner

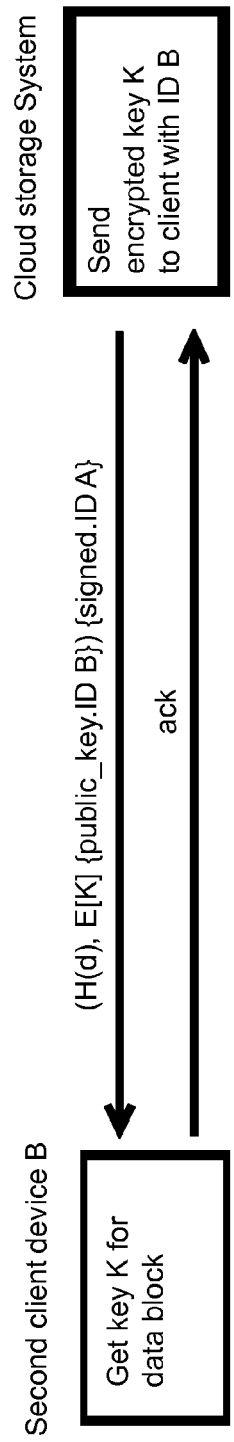
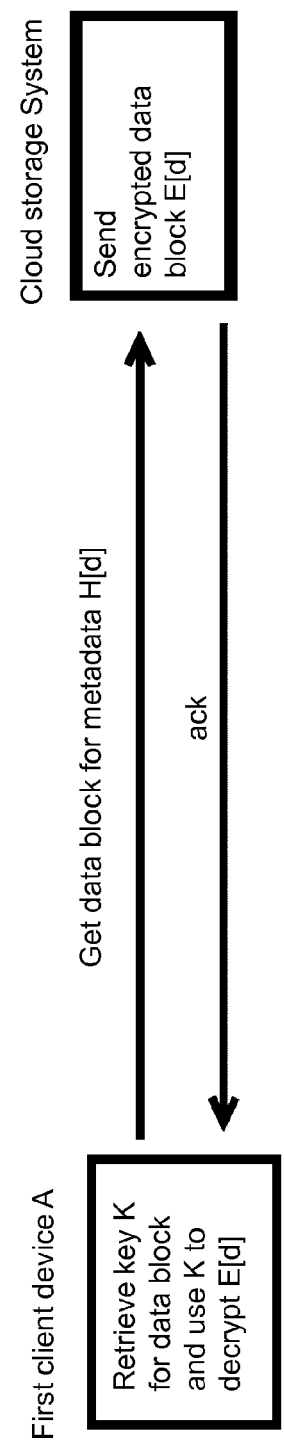

METHOD FOR STORING DATA BLOCKS FROM CLIENT DEVICES TO A CLOUD STORAGE SYSTEM

TECHNICAL FIELD

The invention relates to a method for storing data blocks from client devices to a cloud storage system, the method comprising the steps of: storing an encrypted first data block and a challenge of the first data block of a first client device on the cloud storage system and determining if a hash of a second data block of a second client device stored on the cloud storage system equals the hash of the first data block.

BACKGROUND ART

Data backups of industrial devices and entire control systems can be stored in a cloud, for example on a cloud storage system. In the case of a problem with the local control system, data including operating system, control system and customer-specific configurations can be restored from the remote backup stored in the cloud. Often there is a significant amount of similar or even identical backup data, for example operating system files, control system software, standard software, etc. between different customers and between different backups.

Generally, cloud storage system are designed towards the trade-offs confidentiality versus space: On the one hand, if the data is stored in an encrypted way, the customer owns the encryption key. However, the encrypted data from each tenant typically differs, and, depending on the encryption algorithm, even from backup to backup. On the other hand, a cloud storage system that stores the data in an unencrypted way can reduce the storage space significantly by eliminating the storage of duplicate data. Practically, the backup storage space can be reduced by 90 to 95% for operating system files, control system software and standard software.

Storing the backup data in an unencrypted faces the problem of customer acceptance: Customers are reluctant to send their sensitive data to an unknown server that stores it without protection. Besides that, highly sophisticated targeted attacks may nowadays compromise clouds. Thus, any cloud offering in this area must offer data confidentiality to such an extent that even the service provider is not able to reconstruct the clear text of customer-owned data without the customer being involved.

US 2013/246790 A1 describes a storage method comprising encrypting data with a storage key to obtain encrypted data, encrypting the storage key with two different encryption methods to generate a personal key and a data key, respectively, wherein the personal key can be decrypted with a key from the user who owns the data to obtain the storage key, and the data key can be decrypted with the unencrypted data to obtain the storage key, and saving the encrypted data, personal key and data key in a server.

However, as outlined before the straightforward method of storing data that is encrypted with a customer's key faces the problem of massive data duplication: large quantities of data of different customers are identical and there is even more duplication between daily backups of the same customer. Duplications reduce the overall margin due to the costs for data storage. The backup also takes a longer time and requires more bandwidth, for example, if a complete server image is uploaded daily or even hourly.

SUMMARY OF INVENTION

Therefore, it is an object of the invention to provide a method for storing encrypted data that is not duplicated, even across customers, whereby a service provider of the storage space is not able to decrypt the data and whereby customers cannot find out what others store.

The object of the invention is solved by the features of the independent claim. Preferred embodiments are described in the dependent claims.

Thus, the object is solved by a method for storing data blocks from client devices to a cloud storage system, the method comprising the steps of:

d) storing an encrypted first data block and a challenge of the first data block of a first client device on the cloud storage system, e) determining if a hash of a second data block of a second client device stored on the cloud storage system equals the hash of the first data block, f) if yes, transmitting the challenge of the first data block from the cloud storage system to the second client device, g) extracting, at the second client device, bits at positions or at a range contained in the challenge, hashing the extracted bits, encrypting the hashed bits with a public key of the first client device or of the second client device and uploading the encrypted bits from the second client device to the cloud storage system, and h) storing the encrypted bits from the second client device on the cloud storage system.

It is therefore a key point of the invention to encrypt backup data while at the same time avoiding duplicate data even across customers. The method is therefore a key enabler for any kind of backup service that suffers from duplication issues, while confidentiality of sensitive data is maintained. The method provides an increased margin as storage costs are decreased significantly. From a customer's perspective the method ensures low recovery times when a failure occurs as it only needs to download a recovery image from the backup service. Compared to a solution where a complete server and/or an application software needs to be reinstalled, the method reduces the production downtime and therefore offers a great incentive for investing in this kind of insurance. Compared to a local backup, the method ensures permanent, hassle-free backups. The customer does not need to take care of the data integrity of the backups or verify that a backup has been made but can outsource this service to the cloud storage system provider.

Client devices are computing devices that are capable of accessing files and communicating across a network connection with the cloud storage system. For example, the client devices can be provided as a desktop computer, a laptop computer, a server, a tablet computer, a palm computer, a smart phone, a set top box, or a gaming console. The cloud storage system can be provided as server comprising multiple hard drives for storing the data blocks. The client devices are preferably coupled with the cloud storage system through a communication network, such as a local area network, a wireless network or wide area network.

The step of storing preferably comprises saving the encrypted first data block and the challenge of the first data block on the cloud storage system. The step of determining preferably comprises a comparison between the hash of the second data block and the stored hash of the first data block and reveals a positive response if the comparison results in equality respectively identity. The step of transmitting preferably comprises storing a copy of the challenge of the first data block on the cloud storage system. The step of extracting preferably comprises a logical operation for isolating said bits or the range.

According to another preferred embodiment, the method comprises, prior to the steps d) to h), the following additional steps of:
a) determining if a hash of the first data block of the first client device is stored on the cloud storage system,
b) if not, providing an upload request for the first data block from the cloud storage system to the first client device, and
c) in response thereto, encrypting, at the first client device, the first data block with a randomly generated symmetric key, creating the challenge of hashed bits at randomly chosen bit positions of the first data block or of a bit range of the first data block and encrypting the challenge with the private key of the first client device and uploading the encrypted first data block and the challenge from the first client device to the cloud storage system.

Using a hash of the data block is advantageous as the hash represents a short and most likely unique metadata for each data block. By using a strong hash function computing the data block that corresponds to a given hash is infeasible and thus a secure measure. Further, creating the challenge by asking for the hash of bits at randomly chosen bit positions or ranges in the data block is advantageous as, if the data block is reasonably large in the order of megabytes, and if random ranges are chosen, it is infeasible for an attacker to retrieve the correct hash.

According to a further preferred embodiment, the method comprises the additional step of: i) sending the challenge and the encrypted bits from the cloud storage system to the first client device.

According to another preferred embodiment, the method comprises the additional steps of:
j) extracting, at the first client device, the bits at the positions or at the range contained in the challenge, hashing the extracted bits, encrypting the hashed bits with a public key of the second client device and comparing the encrypted bits with the challenge created in step c) or, comprising step i), with the challenge received in step i),
k) if the comparison results an equality, encrypting the symmetric key used in step c) with the public key of the second client device and sending the encrypted symmetric key together with a new challenge of hashed bits at randomly chosen bit positions of the first data block or of the bit range of the first data block from the first client device to the cloud storage system,
l) storing the new challenge and the encrypted symmetric key on the cloud storage system.

The cloud storage system can ask the first client device to verify the received result by forwarding the old challenge and the response received from the second client device to the first client device. With steps j) to l) the first client device can then verify the second client's claim of ownership by computing the hash of the bits at the given ranges. Alternatively, the first client device can keep track of its currently issued challenges and store the hashes.

According to a further preferred embodiment, the method comprises the additional steps of:
m) sending the encrypted symmetric key from the cloud storage system to the second client device,
n) decrypting the symmetric key with a private key of the second client and storing the symmetric key of the second client device.

The cloud storage system sends the encrypted key to the second client device preferably being signed by the first client device so that the second client device can verify the authenticity. As the symmetric key is encrypted with the private key of the second client, the second client device can decrypt it and store it for later use.

According to another preferred embodiment, the method comprises the additional steps of:
o) sending a download request for the first data block from the first client or second client to the cloud storage system,
p) in response thereto, sending the encrypted first data block from cloud storage system to the first client or second client device,
q) decrypting the received first data block with the symmetric key at the first client or second client device.

Steps o) to q) provide a retrieval mechanism for the first data block. Preferably, the first or second client device send the hash of the first data block. In return thereto the cloud storage system sends the encrypted first data block. The first or second client device can then recover the first data block by using the corresponding symmetric key.

According to a further preferred embodiment, the method comprises the additional steps of:
if the first client device cannot be accessed for executing step i) or step j), providing an upload request for the second data block from the cloud storage system to the second client device,
in response thereto, encrypting, at the second client device, the second data block with a further randomly generated symmetric key, creating a further challenge of hashed bits at randomly chosen bit positions of the second data block or of a bit range of the second data block and encrypting the further challenge with the private key of the second client device and uploading the encrypted second data block and the further challenge from the first second device to the cloud storage system,
temporarily storing the encrypted second data block and the further challenge at the cloud storage system,
once the first client device can be accessed again, perform step i) or steps i) and j), and, if the comparison is successful, delete the temporarily stored encrypted second data block and the further challenge from the cloud storage system.

If the first client device cannot be reached for example due to failure or network downtime, the second client device may not have access to a respective data block until the first client device vouches for the second client device's claim of ownership. For resolving such situation and for making the method independent from the availability of the client device, after receiving the hash of the first data block, the cloud storage system issues an upload request and multiple copies of the same data block are stored temporarily until all client devices owning the same data block have been verified. Thereafter, the "extra" copy of the data block can be deleted.

According to another preferred embodiment, the method comprises the additional step of: performing, at the cloud storage system, homomorphic encryption in regard to uploaded challenge and the uploaded encrypted bits from the second client device. Homomorphic encryption has been proven especially advantageous and effective. According to a further preferred embodiment, the method comprises the additional step of: sending and acknowledgment, by the first client device, second client device and/or the cloud storage system, in response to an upload.

According to another preferred embodiment, the method comprises a public key infrastructure for provisioning the public key of the first client device and/or the public key of the second client device. Such public key infrastructure is preferably connected via a communication network with the client devices and/or the cloud storage system.

According to a further preferred embodiment, the first data block and/or the second data block comprises a size of 0.5, 1, 2 or 5 MB. According to another preferred embodiment, an individual symmetric key is provided to each first data block and/or each second data block.

BRIEF DESCRIPTION OF DRAWINGS

These and other aspects of the invention will be apparent from and elucidated with reference to the embodiments described hereinafter.

In the drawings:

FIGS. 2 to 6 show different flow charts for the method according to the preferred embodiment of the invention.

DESCRIPTION OF EMBODIMENTS

Figure 1:
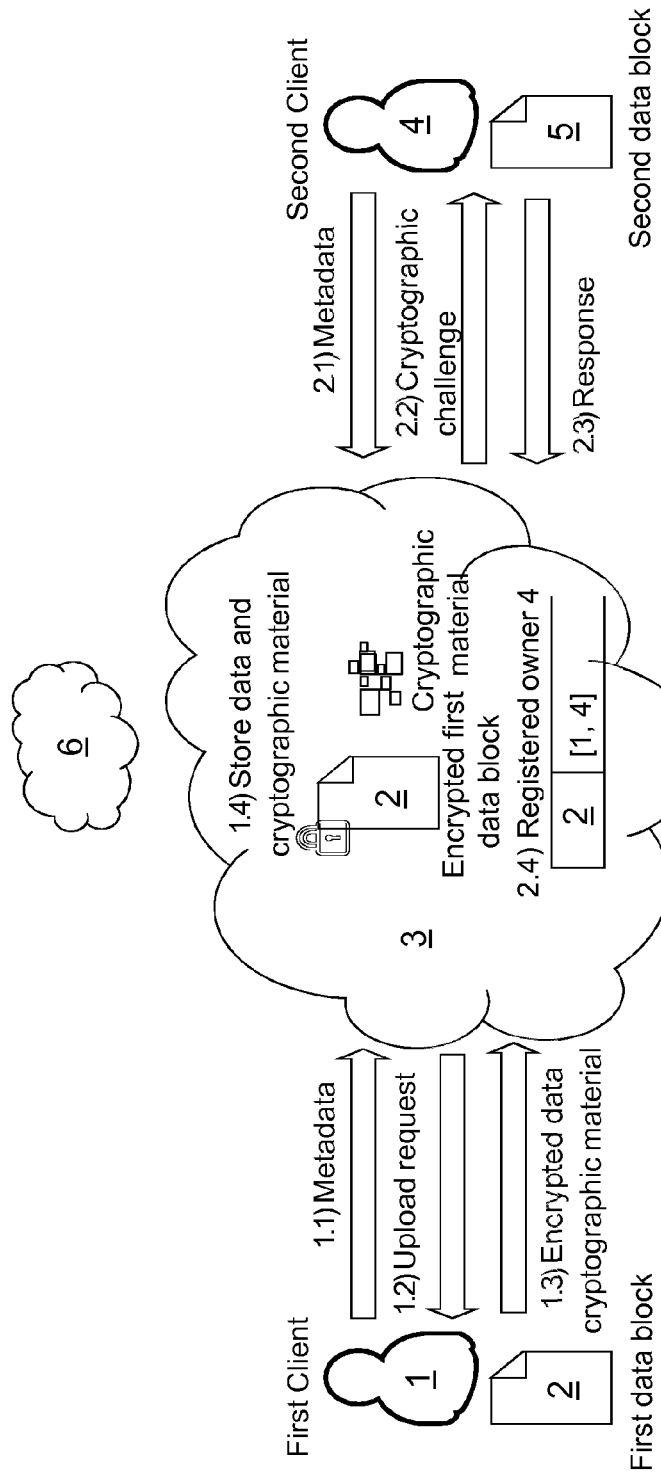
FIG. 1 shows an arrangement for performing the method according to a preferred embodiment of the invention in a schematic view.

FIG. 1 shows a basic mechanism of the method according to a preferred embodiment of the invention. When a first client device 1 wants to upload a sensitive first data block 2 onto a cloud storage system 3, the first client device 1 first sends plaintext metadata in form of a hash of the first data block 2 to the cloud storage system 3 to check if the first data block 2 has been stored already on the cloud storage system 3 (Step 1.1). This metadata is short and uniquely identifies the first data block 2. If the first data block 2 does not exist on the cloud storage system 3 yet, the first client device 1 sends the first data block 2 in encrypted form together with cryptographic material to the cloud storage system 3 (Step 1.3) upon receiving an upload request (Step 1.2). Subsequently, the cloud storage system 3 stores the encrypted first data block 2 plus the cryptographic material (Step 1.4).

If the second client device 4 wants to store a second data block 5, the cloud storage system 3 uses the metadata provided by the second client device 4 (Step 2.1) to check whether the cloud storage system 3 already stores the second data block 5. If the cloud storage system 3 has not seen this metadata before, i.e., the cloud storage system 3 received the upload request for a new block i.e. the second data block 5, the same steps as for the first client device 1 (Step 1.2 to 1.4) are carried out. Otherwise, the cloud storage system 3 uses the cryptographic material for a challenge-response exchange with the second client device 4 (Steps 2.2 to 2.3) to verify that the stored first data block 2 and the second data block 5 that the second client device 4 wants to upload are the same. Thus, second client device 4 proves ownership of the same data block 2, without revealing any information on the content of the first data block 2. If the verification is successful, second client device 4 is added as an owner of the first data block 2, granting second client device 4 the right to access it in the future (Step 2.4).

The method ensures that each individual data block 2, 5 is not only stored only once but also transferred to the cloud storage system 3 only once, which minimizes the bandwidth usage, while guaranteeing the confidentiality of the data of the data block 2, 5 in the sense that the cloud storage system 3 does not learn anything about the content of the data block 2, 5 itself except for the metadata derived from the data. Since the data is sent block by block, as opposed to sending files, an attacker with access to the cloud storage system 3 further cannot deduce anything about the size of the stored data block 2, 5 because all data blocks 2, 5 are of equal size.

Depending on the implementation of the cryptographic challenge, it is advantageous for the cloud storage system 3 to interact with the first client device 1 as the original uploader of the first data block 2 in order to grant access to the second client device 4 that passed said ownership test, as described later. If the first client device 1 cannot be reached (all the time), the second client device 4 may not have access to the first data block 2 until the first client device 1 vouches for the second client device's 4 claim of ownership.

A delay-tolerant variant to the basic scheme described before solves this issue: After receiving the metadata, the cloud storage system 3 always issues an upload request and multiple copies of the same data block 2, 5 are stored temporarily until all clients devices 1, 4 owning the same data block 2, 5 have been verified. At this point, the extra copy (or copies) of the data block 5 can be deleted. The advantage of this scheme is clearly that there is no dependency on the availability of clients 1, 4. However, slightly more disk space is used temporarily at the cloud storage system 3 and also more bandwidth is consumed due to the repeated upload of the same data block 2, 5. Overall, the space requirements on the cloud storage system 3 is lowered substantially while preserving the confidentiality of the stored data.

Figure 2:
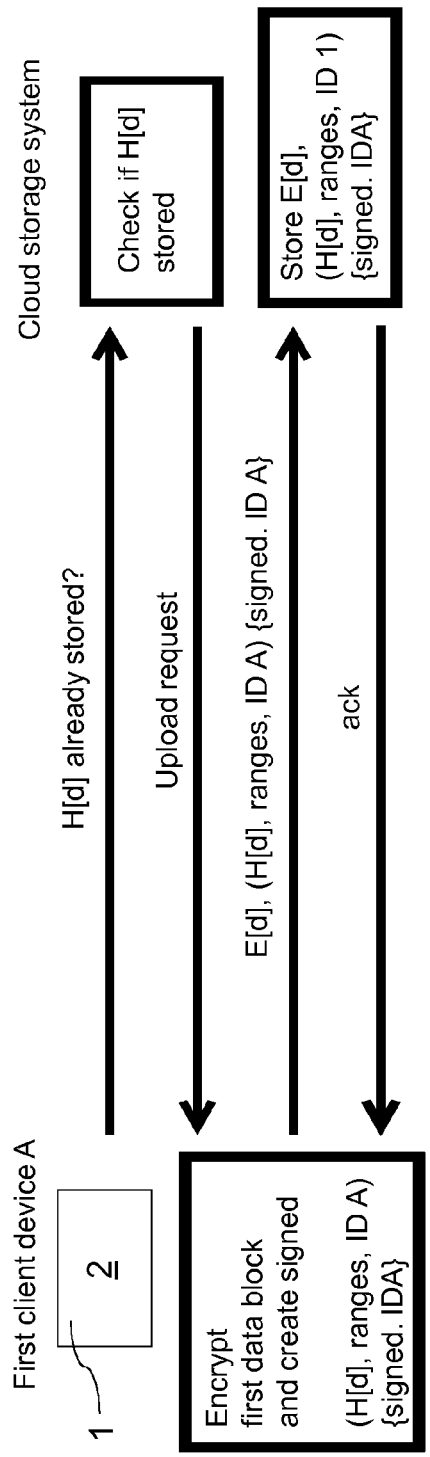

FIG. 2 shows a more concrete embodiment of the method described before for storing the first data block 2 and a challenge for the first data block 2 in the cloud storage system 3. A hash of the data item is used as the short and (most likely) unique metadata for each data item. Given a strong hash function, computing the data block that corresponds to a given hash is infeasible. Each data block 2, 5 is encrypted using a new randomly generated symmetric key. The first client device 1 holds the symmetric keys. Since symmetric keys are small, key storage does not require much space.

A challenge is implemented by asking for the hash of bits at randomly chosen bit positions or ranges in the first data block 2. If the first data block 2 is reasonably large, e.g., in the order of megabytes, and random ranges are chosen, it is infeasible for an attacker to get the correct hash. FIG. 2 shows a insertion mechanism using hashes and cryptographic challenges based on ranges. Note that the first client device 1 respectively client A signs the challenge so that it its authenticity can be verified, i.e., by a public key infrastructure 6.

Figure 3:
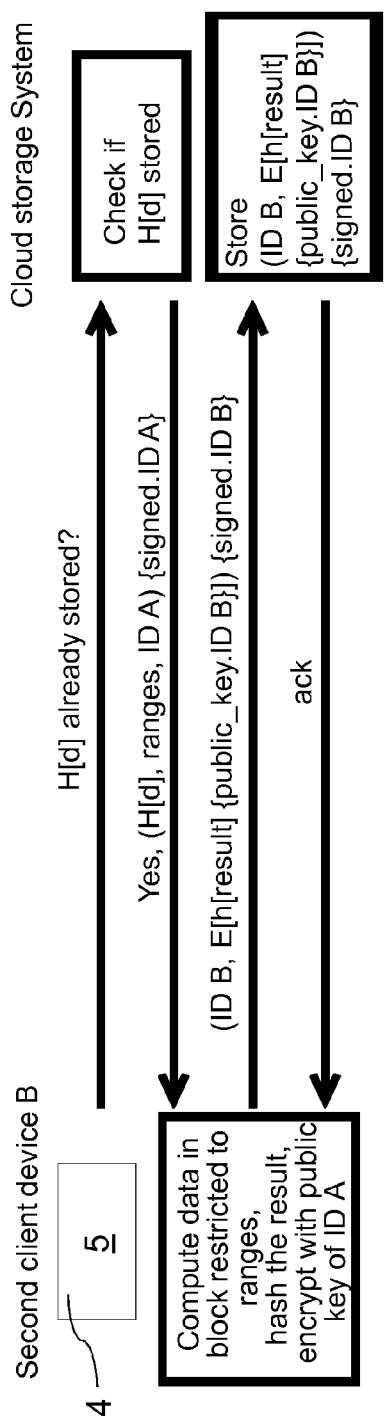

Second client device 4 respectively client B can prove that it owns the same data block 2, 5 by extracting the bits at the ranges given in the challenge, hashing them, encrypting the result with its own public key, and sending the signed result to the cloud storage system 3, see FIG. 3 showing the second client device 2 trying to store the same data block 5 on the cloud storage system 3. Instead of storing the data block 5 again, the second client device 4 must prove that it has the data block 5 by submitting the right response to a challenge. Alternatively, it can also use the first client device's 1 public key to encrypt the result.

The cloud storage system 3 can then ask the first client device 1 to verify the received result by forwarding the old challenge and the response received from the second client device 4 to the first client device 1. The first client device 1 verifies the second client device's 4 claim of ownership by computing the hash of the bits at the given ranges, encrypting this hash with the second client device's 4 public key and checking for equality.

Figure 4:
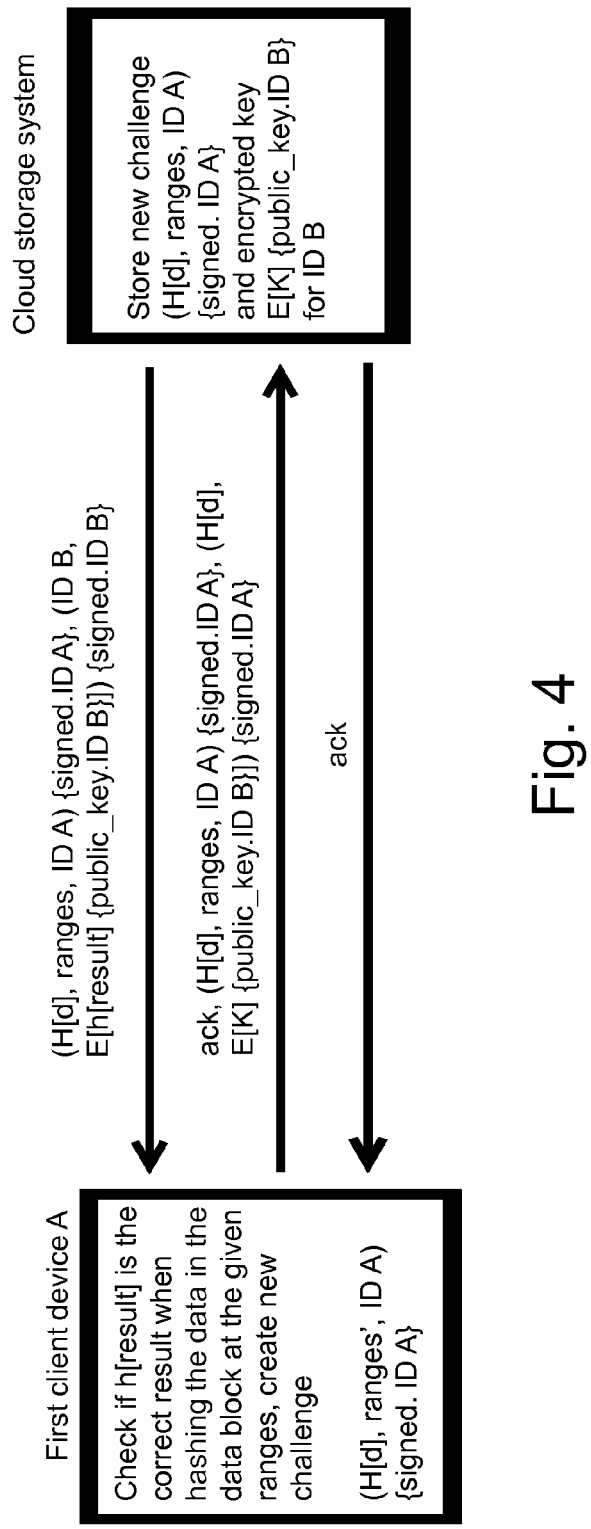

Alternatively, the first client device 1 can keep track of its currently issued challenges and store the hashes. In this case, the first client device 1 must only encrypt the hash with the second client device's 4 public key to verify that the second client 4 indeed possesses the same data block 2, 5. If the verification is successful, the first client device 1 encrypts the symmetric key K that it used to encrypt this block with the second client device's 4 public key and sends it to the cloud storage system 3, together with a new challenge for the same data block 2, 5. The cloud storage system 3 stores the new challenge and the encrypted key K, see FIG. 4.

Finally, the cloud storage system 3 sends the encrypted key K to the second client device 4. This message is signed by the first client device 1 so that the second client device 4 can verify the authenticity of the message. Since the block key K is encrypted with the second clients device's 4 public key the second client device 4 can decrypt it and store it for later use, see FIG. 5.

The data block retrieval mechanism works in an analogous manner. The first client device 1 asks for a specific data block 2, 5 by sending the blocks metadata, e.g., a hash of the data block 2,5. The cloud storage system 3 returns the encrypted data block 2, 5. The first client device 1 can then use the corresponding symmetric key to recover the first data block 2, see FIG. 6.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 1 first client device
2 first data block
3 cloud storage system
4 second client device
5 second data block
6 public key infrastructure

The invention claimed is:

1. A method for storing data blocks from client devices to a cloud storage system, the method comprising the steps of:
   storing a first data block that is encrypted, a challenge and a hash of the first data block of a first client device on the cloud storage system,
   determining if a hash of a second data block of a second client device stored on the cloud storage system equals the hash of the first data block,
   if yes, transmitting the challenge of the first data block from the cloud storage system to the second client device,
   extracting, at the second client device, bits at positions or at a range contained in the challenge, hashing the bits that are extracted, encrypting the bits that are hashed with a public key of the first client device or of the second client device and uploading the bits that are encrypted from the second client device to the cloud storage system,
   storing the bits that are encrypted from the second client device on the cloud storage system,
   sending the challenge and the bits that are encrypted from the cloud storage system to the first client device,
   extracting, at the first client device, the bits at the positions or at the range contained in the challenge, hashing the bits that extracted, encrypting the bits that are hashed with a public key of the first client device or a public key of the second client device depending on the key chosen in the step of extracting at the second client device and comparing the bits that are encrypted with the challenge,
   if the comparison results in equality, encrypting a symmetric key with the public key of the second client device and sending the encrypted symmetric key together with a new challenge of hashed bits at randomly chosen bit positions of the first data block or of a bit range of the first data block from the first client device to the cloud storage system, and
   storing the new challenge and the encrypted symmetric key on the cloud storage system.

2. The method according to claim 1, comprising the additional steps of:
   determining if a hash of the first data block of the first client device is stored on the cloud storage system,
   if not, providing an upload request for the first data block from the cloud storage system to the first client device,
   in response thereto, encrypting, at the first client device, the first data block with a randomly generated symmetric key, creating the challenge of hashed bits at randomly chosen bit positions of the first data block or of the bit range of the first data block and encrypting the challenge with the private key of the first client device and uploading the first data block that is encrypted and the challenge from the first client device to the cloud storage system.

3. The method according to claim 1, comprising the additional steps of:
   sending the encrypted symmetric key from the cloud storage system to the second client device,
   decrypting the symmetric key with a private key of the second client device and storing the symmetric key of the second client device.

4. The method according to claim 1, comprising the additional steps of:
   sending a download request for the first data block from the first client or second client device to the cloud storage system,
   in response thereto, sending the first data block from cloud storage system to the first client or second client device,
   decrypting the received first data block with the symmetric key at the first client or second client device.

5. The method according to claim 1, comprising the additional steps of:
   if the first client device cannot be accessed for executing step i) or step j), providing an upload request for the second data block from the cloud storage system to the second client device,
   in response thereto, encrypting, at the second client device, the second data block with a further randomly generated symmetric key, creating a further challenge of hashed bits at randomly chosen bit positions of the second data block or of a bit range of the second data block and encrypting the further challenge with the private key of the second client device and uploading the encrypted second data block and the further challenge from the second device to the cloud storage system, temporarily storing the encrypted second data block and the further challenge at the cloud storage system, once the first client device can be accessed again, perform the sending step, or perform the sending step and the extracting step at the first client device) or, and, if the comparison is successful, delete the temporarily stored encrypted second data block and the further challenge from the cloud storage system.

6. The method according to claim 1, comprising the additional step of:

performing, at the cloud storage system, homomorphic encryption in regard to uploaded challenge and the uploaded encrypted bits from the second client device.

7. The method according to claim 1, comprising the additional step of:

sending an acknowledgment, by the first client device, second client device and/or the cloud storage system, in response to an upload request.

8. The method according to claim 1, comprising a public key infrastructure for provisioning the public key of the first client device and/or the public key of the second client device.

9. The method according to claim 1, whereby the first data block and/or the second data block comprises a size of 0.5, 1, 2 or 5 MB.

10. The method according to claim 1, whereby an individual symmetric key is provided to each first data block and/or each second data block.

11. The method according to claim 2, comprising the additional steps of:

sending the encrypted symmetric key from the cloud storage system to the second client device, decrypting the symmetric key with a private key of the second client device and storing the symmetric key of the second client device.

12. The method according to claim 2, comprising the additional steps of:

sending a download request for the first data block from the first client or second client device to the cloud storage system, in response thereto, sending the first data block from cloud storage system to the first client or second client device, decrypting the received first data block with the symmetric key at the first client or second client device.

13. The method according to claim 3, comprising the additional steps of:

sending a download request for the first data block from the first client or second client device to the cloud storage system, in response thereto, sending the first data block that is encrypted from cloud storage system to the first client or second client device, decrypting the received first data block with the symmetric key at the first client or second client device.

14. The method according to claim 2, comprising the additional steps of:

if the first client device cannot be accessed for executing the sending step or the extracting step at the first client device, providing an upload request for the second data block from the cloud storage system to the second client device, in response thereto, encrypting, at the second client device, the second data block with a further randomly generated symmetric key, creating a further challenge of hashed bits at randomly chosen bit positions of the second data block or of a bit range of the second data block and encrypting the further challenge with the private key of the second client device and uploading the encrypted second data block and the further challenge from the second device to the cloud storage system, temporarily storing the encrypted second data block and the further challenge at the cloud storage system, once the first client device can be accessed again, perform the sending step, or perform the sending step and the extracting step at the first client device, and, if the comparison is successful, delete the temporarily stored encrypted second data block and the further challenge from the cloud storage system.

15. The method according to claim 3, comprising the additional steps of:

if the first client device cannot be accessed for executing the sending step or the extracting step at the first client device, providing an upload request for the second data block from the cloud storage system to the second client device, in response thereto, encrypting, at the second client device, the second data block with a further randomly generated symmetric key, creating a further challenge of hashed bits at randomly chosen bit positions of the second data block or of a bit range of the second data block and encrypting the further challenge with the private key of the second client device and uploading the encrypted second data block and the further challenge from the second device to the cloud storage system, temporarily storing the encrypted second data block and the further challenge at the cloud storage system, once the first client device can be accessed again, perform the sending step, or perform the sending step and the extracting step at the first client device, and, if the comparison is successful, delete the temporarily stored encrypted second data block and the further challenge from the cloud storage system.

16. The method according to claim 4, comprising the additional steps of:

if the first client device cannot be accessed for executing the sending step or the extracting step at the first client device, providing an upload request for the second data block from the cloud storage system to the second client device, in response thereto, encrypting, at the second client device, the second data block with a further randomly generated symmetric key, creating a further challenge of hashed bits at randomly chosen bit positions of the second data block or of a bit range of the second data block and encrypting the further challenge with the private key of the second client device and uploading the encrypted second data block and the further challenge from the second device to the cloud storage system, temporarily storing the encrypted second data block and the further challenge at the cloud storage system, once the first client device can be accessed again, perform the sending step, or perform the sending step and the extracting step at the first client device, and, if the comparison is successful, delete the temporarily stored encrypted second data block and the further challenge from the cloud storage system.

17. The method according to claim 2, comprising the additional step of:
performing, at the cloud storage system, homomorphic encryption in regard to uploaded challenge and the uploaded encrypted bits from the second client device.

18. The method according to claim 3, comprising the additional step of:
performing, at the cloud storage system, homomorphic encryption in regard to uploaded challenge and the uploaded encrypted bits from the second client device.

19. The method according to claim 4, comprising the additional step of:
performing, at the cloud storage system, homomorphic encryption in regard to uploaded challenge and the uploaded encrypted bits from the second client device.

20. The method according to claim 5, comprising the additional step of:
performing, at the cloud storage system, homomorphic encryption in regard to uploaded challenge and the uploaded encrypted bits from the second client device.

* * * * *